Jan. 9, 1945.  W. J. NIGHTINGALE  2,367,045
UNIVERSAL MULTIDOGGING DEVICE
Filed July 17, 1943   2 Sheets-Sheet 1

INVENTOR
William J. Nightingale
BY
ATTORNEYS.

Jan. 9, 1945.  W. J. NIGHTINGALE  2,367,045
UNIVERSAL MULTIDOGGING DEVICE
Filed July 17, 1943  2 Sheets-Sheet 2

INVENTOR
William J. Nightingale,
BY
ATTORNEYS.

Patented Jan. 9, 1945

2,367,045

UNITED STATES PATENT OFFICE 2,367,045

UNIVERSAL MULTIDOGGING DEVICE

William J. Nightingale, Oak Park, Ill., assignor of one-half to George C. Bruen, Chicago, Ill.

Refiled for abandoned application Serial No. 309,464, December 15, 1939. This application July 17, 1943, Serial No. 495,141

14 Claims. (Cl. 82—40)

The present invention relates to machine tools and particularly relates to dogging devices for use with machines, such as lathes; this application constituting a refiling of my application for U. S. patent, Ser. No. 309,464, filed December 15, 1939, and subsequently forfeited.

In metal working, the prior common method of driving centered work in a lathe is with the use of a single tail dog. Such dog is generally L-shaped, having the leg thereof clamped to the work which projects through an opening therein, with the tail of the dog received within a radial slot provided in a face plate on the lathe. This prior method has several disadvantages, one of them being that it is difficult to accurately center the work because the tail may strike the bottom of the slot before the work is fully in place on the center. The work should always be accurately centered on the points of the lathe centers and not be crowded to one side, as accurate work is impossible under these conditions. A straight-tail dog can be used, but this necessitates a driving stud in the face plate. Another disadvantage of this prior method is that it is necessary to keep on hand a plurality of dogs, making up a set, for the accommodation of different size work, since each dog is only capable of use within a slight range of work size. It is therefore necessary to use different sized dogs for correspondingly different size work. The set-up time in changing work and changing dogs on the machine is considerable and represents a production loss.

In certain types of machine operation only one end of the piece of work is supported on the live or spindle center and the other end is supported in a steady rest. Dogs of the type mentioned above have been used; and the work is held against the live center by a bridle or strap having the ends thereof fixed to the face plate to pull the dog thereagainst. This is an unsatisfactory and makeshift method.

One of the primary objects of the present invention is to provide an improved dogging device of such a character that it may be mounted on a lathe and need not be removed therefrom when changing workpieces, even though such changes in work involve differences in size of the pieces worked on, thereby saving considerable productive time.

Another object of the invention is to provide an improved dogging device of such a character that a single unit may be used throughout the range of workpiece sizes that heretofore has required a complete set of dogs of the prior type mentioned above, thereby effecting considerable savings in money and productive time.

Another object of the invention is to provide a dogging unit which serves to accurately clamp the work on center and which eliminates the necessity for the face plate required when using dogs of the prior type mentioned above.

Another object of the invention is to provide a dogging device of such a character that the work may be mounted on centers in less time with the assurance that the work will not be crowded to one side of the center.

Another object of the invention is to provide a dogging device of such a character that it is self-centering, and slip-proof, thereby providing a balanced drive which reduces tool breakage.

Another object of the invention is to provide a dogging device which eliminates the use of the bridle or strap when one end of the workpiece is supported in a steady rest.

Another object of the invention is to provide an improved dogging device in which the clamping means thereon are so constructed and balanced that they inherently exert equal pressures on opposite sides of the workpiece so that the workpiece will not be shifted off center when the dog is clamped thereto.

Other objects of the invention will become apparent from the following specification, the drawings relating thereto and from the claims hereinafter set forth.

In the drawings in which like numerals are used to represent like parts in the several views throughout;

Figure 1:
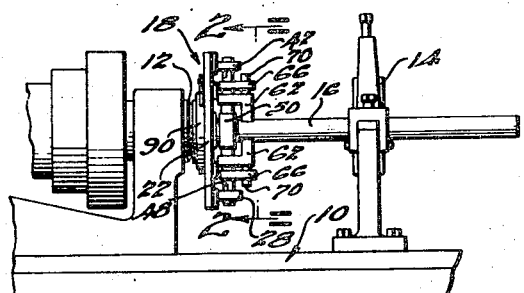
Figure 1 is a fragmentary side elevational view of a metal working lathe, using a steady rest, and employing a dogging device according to the present invention.
Figure 2:
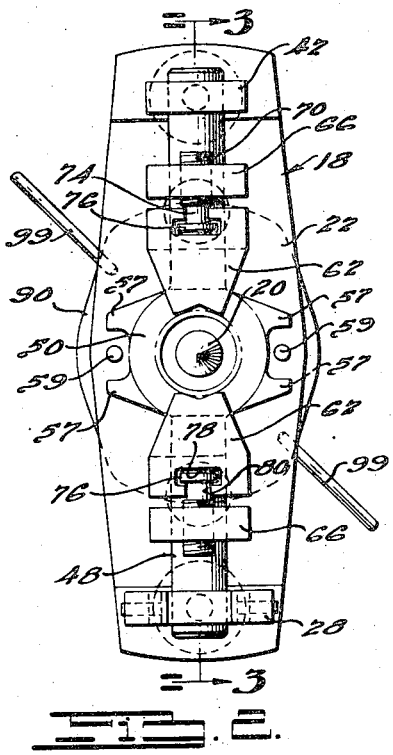
Fig. 2 is an end elevational view of the dogging device illustrated in Fig. 1, taken substantially along the line 2—2 thereof.

Referring to the drawings, a conventional lathe is generally indicated at 10 having a live or driving spindle 12 mounted thereon in the usual way. A conventional steady rest 14 is also mounted on the lathe 10, and is adapted to support a piece of metal stock 16, adjacent one end thereof, which is the piece being worked upon. A unitary dogging device, according to the present invention, is generally indicated at 18, and is mounted on the live spindle 12 in driving relationship therewith.

One of the lathe center point elements is indicated at 20, and is associated with the live spindle 12 in the usual way and projects inwardly therebeyond. Another lathe center point element, not shown, is also on the lathe in alignment with the element 20 in the usual way. In the illustrated embodiment of the invention, the work piece 16 is shown as having one end thereof mounted on a steady rest, but it is to be understood that the present invention is equally adapted to the type of work when both ends of the stock 16 would be centered on the center points of the lathe in the usual way.

The present invention is primarily concerned with the construction and operation of the dogging device 18, and such dogging device is adapted for use whether both ends of the stock are centered or whether one end is centered and the other end supported within a steady rest, as mentioned above. The dogging device 18 includes a supporting plate member 22 having a central hub portion 24 of greater thickness than the major portion thereof with side portions projecting radially outwardly therebeyond at diametrically opposed positions. The supporting member 22 is suitably mounted on the live spindle 12 so that upon driving of the spindle the dog unit 18 is driven thereby. In the embodiment illustrated, the hub portion 24 is provided with a central aperture therethrough which is threaded so that the support is threadably received over the threaded end of the spindle 12.

The member 22 is provided with openings 26 therethrough in the side portions adjacent the outer ends thereof, the axis of such openings being substantially parallel to the line between the lathe center points or the center line axis of the stock 16 when such stock is in its properly centered position.

A generally rectangular mounting member 28 is mounted to said supporting member 22 adjacent one of the outer ends thereof, and such mounting member includes a generally rectangular aperture 30 therein with an integral pin portion 32 at the mid point of one side thereof. The pin portion 32 is slidably received within one of the openings 26 and is so fixed with respect thereto that the rectangular member 28 may move toward and from the supporting member 22 and also turn about the axis of the pin 32 with respect to the supporting member. The rectangular member 28 is positioned on the front side of the supporting member, and the connection is such that such member 28 is resiliently urged toward the supporting member 22. The connection for the mounting member 28 includes a spiral spring 34 having one end thereof received over an annular shoulder 36 formed integral with the member 22 on the back face thereof around the opening 26, and having the other end thereof embracing an annular shoulder of a retainer cap 38. The retainer cap is fixed to the pin 32 by means of a transversely extending pin 40 which is passed through the pin member 32 and projects therebeyond so as to limit the axial movement of the cap 38 with respect to the pin 32. It will thus be seen that the spring 34 constantly, resiliently urges the member 28 toward the supporting plate 22.

Another mounting block 42 has a central circular opening 44 formed therein and has a substantially straight inner edge which is adapted to abut against the face of the supporting member 22 adjacent that end opposite to that to which the member 28 is mounted. The block 42 has an integral stem portion 46, similar to the stem portion 32, above described, which is slidably received through the opening 26 at such opposite end. The block 42 is resiliently mounted with respect to the supporting member by means of a coil spring 34 and a retainer cap 38, which are disposed in the same relationship as that described above in connection with the resilient mounting for the member 28.

Figure 3:
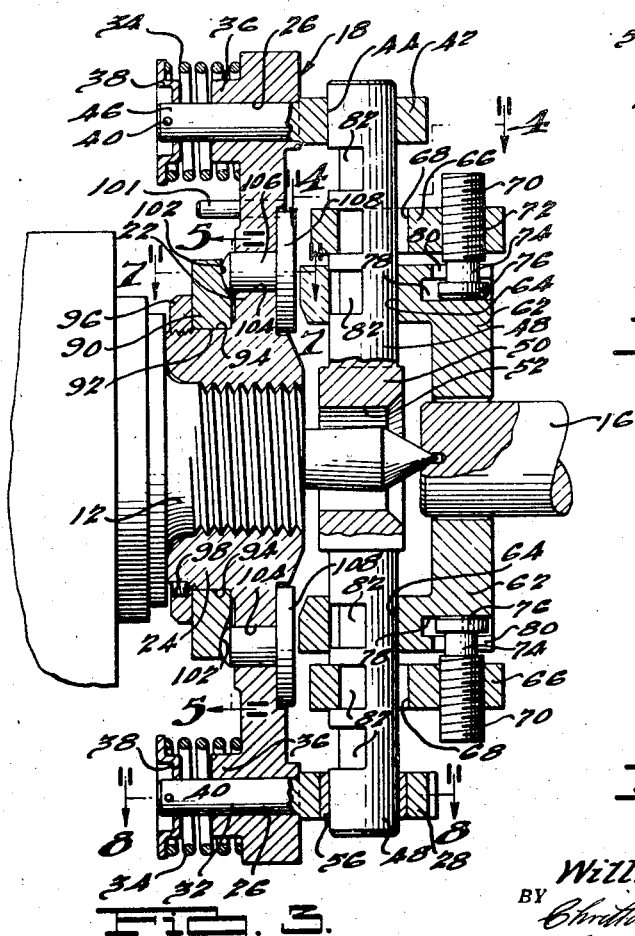
Fig. 3 is an enlarged cross-sectional view taken substantially along the line 3—3 of Fig. 2 and showing the dog attached to the lathe driving spindle.
Figure 8:
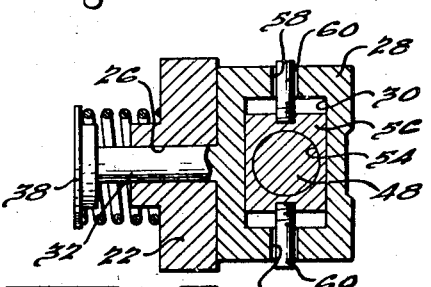
Fig. 8 is a cross-sectional view taken substantially along the line 8—8 of Fig. 3.

A floating bar 48 is provided which has a central hub portion 50 with an aperture 52 therethrough so that the center point element 20 projects through the aperture 52 beyond the bar 48 to a position such as that illustrated in Fig. 3 when the parts are assembled. One of the ends of the bar member 48 is slidably received within opening 44 of supporting block 42. The other end of the bar 48 is slidably received within an aperture 54 formed in a bearing block member 56 (Figs. 3 and 8). The block 56 is generally rectangular in form and has a width substantially equal to the width of the rectangular aperture 30 in member 28, but is of a length less than the length of such aperture 30 so that the block member 56 is slidable with respect to the block member 28. The block member 28 is provided with aligned apertures 58 therethrough; and oppositely disposed guide pins 60 are threaded into the block 56 and are adapted to project through the apertures 58. The apertures 58 are larger than the pins 60 so that there may be freedom of movement between the block member 56 and the member 28, but the pins 60 are of such a length that the block member will be prevented from falling out of its position with respect to the member 28.

It will thus be seen that the bar 48 is free to slide, in a direction along its length, with respect to the supporting member 22, and also that one end of the bar member 48 may slide transversely of the member 22 while both ends can pivot with respect thereto. Also, the bar may be moved away from the plate member 22 against the resistance of springs 34. A floating mounting is thus provided for the bar 48 with respect to the supporting member 22.

In order to limit the extent to which the bar 48 may move along its length with respect to the support 22 so that its ends will not drop out of the member 42 and 56, projections 57 are formed integral with the hub portion 50. Stop pins 59 are fixed to the front face of member 22 between the projections 57, so that such projections will strike against the pins to limit movement of the bar 48.

A pair of driving or clamping jaws 62 are slidably mounted on the bar 48 and are disposed on opposite sides of the central portion thereof to provide facing jaws which are adapted to clamp against the workpiece 16. The jaws are generally L-shaped, and have circular openings 64 formed in the leg portions thereof. Such openings 64 are of substantially the same diameter as the diameter of the bar 48 and are adapted to slide therealong so that they are movable toward and away from each other.

In order that the present unit may be used with a wide range of stock sizes and may be used to replace a complete set of the prior type dogs discussed above, the jaws 62 are so mounted and may be fixed with respect to each other at a plurality of points along the length of the bar 48 between the mounting blocks 28 and 42. In order to adjustably fix the jaws 62 with respect to the bar 48, a back-up plate 66 is provided for each of the jaws 62, and is slidably mounted on the bar 48 behind or disposed radially outwardly of the legs of jaws 62. Each of such plates 66 has a circular opening 68 formed therein which has a diameter substantially the same as the outside diameter of bar 48.

The backing plate 66 is connected to its adjacent jaw 62 by means of a set screw 70, which may be of the Allen type and which is threadably received within a tapped opening 72 formed in the plate member 66. The screw 70 extends radially inwardly and has a reduced portion 74 terminating in an enlarged head 76 at the inner end thereof. The enlarged head is slidably received within a groove 78 formed in the jaw 62, which opens through the jaw face of the member 62 and which communicates with another slot 80 of less width than the width of the groove 78 and of substantially the same width as the diameter of the reduced portion 74 of the screw 70. The reduced portion 74 is, thereby, slidably received within the groove 80 and the enlarged head is slidably received within the groove 78, the groove 78 having a width substantially equal to the width of the head 76.

For rough adjustments of the jaws 62 with respect to each other, the backing plates 66 are fixed against axial movement with respect to the bar 48 at any one of a plurality of positions, there being three of such positions illustrated for each of the jaws in the embodiment here described. This is accomplished through the formation of arcuate grooves 82 on the rear side of the bar 48 and at spaced positions therealong. The bases of such grooves are preferably formed on a radius substantially equal to the radius of the aperture 68, and the width of such slots is slightly greater than the width of the plate 66 so that such plate may drop into these grooves and abut against the side walls thereof so that axial movement of the plate 66 with respect to the bar 48 will be prevented. This rough setting of the jaws may be readily accomplished when the jaws are out of engagement with the stock by merely disengaging the plate 66 from the particular groove 82 with which it is associated, and then sliding such plate, together with the jaw, along the bar and dropping the plate 66 into the groove desired.

The grooves 82 are of a less width than the thickness of the jaws 62, so that such jaws will readily slide over the grooves without dropping therein.

For the finer adjustments of the jaws with respect to each other and for clamping the jaws to the work, it will be appreciated that the jaws 62 may be moved toward and away from their respective backing plates 66 by turning the set screws 70. Turning of the set screws 70 in one direction will cause the jaws 62 to move away from the plates 66 through the connection of the enlarged head 76 in the grooves 78, as the inner face of such head abuts against the base of the groove 78. The turning of the screws in the opposite direction will cause the jaws to move toward the plate members 66 as the outside surface of the enlarged head 76 will abut against the overhanging edge adjacent the slot 80 and pull the jaws toward their respective backing members 66.

In the use or operation of the structure so far described, assuming that the workpiece 16 has been centered on both center points of a lathe, the dog is clamped to the workpiece in the following way. Depending upon the size of the workpiece, the clamping jaws 62 are roughly positioned with respect to each other by selectively positioning the backing members 66 within the grooves 82 corresponding roughly to the size of the workpiece. One of the screws 70 is then turned to urge its jaw 62 toward the workpiece to such a position that it is just about in contact with the workpiece. The other set screw on the other plate 66 is then turned so that its jaws are forced against the workpiece. Since the jaws are fixed with respect to each other through the floating bar 48 and the connection of the members 66 therewith through the grooves 82, and due to the mounting of the floating bar 48, it will be seen that both of the jaws clamp the workpiece equally and are drawn radially inwardly of the workpiece in exactly equal increments and with exactly the same pressure applied to both sides of the workpiece. Also, the jaws are self-aligning so that the workpiece is properly engaged. It will thus be evident that the workpiece cannot be pulled off center and that the tightening operation of the last set screw may be accomplished as rapidly and with as much pressure as desired without in any way disturbing the center of the workpiece.

It also clearly follows that the workpiece 16 may be just as easily and quickly removed from its engagement with the dog without removing the unit 18 from the lathe. Another workpiece of the same or a different size may be immediately applied to the machine and the positioning of the jaws with respect to the new workpiece, whether it be of the same or a different size, is readily accomplished.

The dog unit of the present invention is also so constructed and is provided with such means that the workpiece is held against the live center when the other end of the workpiece is supported in a steady rest, thereby eliminating the need for the make shift bridles or straps previously used.

In order to accomplish this, a cam plate 90 having a central circular aperture 92 formed therein is rotatably mounted on an annular shoulder 94 formed in the hub portion 24 of the supporting plate 22. Such plate 90 is rotatable on the shoulder 94 with respect to the member 22 and is fixed against axial displacement with respect thereto by means of a thrust ring 96 which is threadably received over the rear end of the hub portion 24 and may be fixed against rotation by means of a safety set screw 98.

So that the cam plate 96 may be rotated with respect to the plate 22, handles 99 are fixed to the cam plate 90 in such positions that they do not interfere with the operation of the dog but are readily accessible. In order to limit the rotative movement of the cam member 90 with respect to the support 22, a stop pin 101 may be fixed to the member 22 and projects in the line of rotative movement of the handles 99 so that such handles abut against the pin 101 when they have been turned a predetermined distance.

The cam plate 90 is provided with oppositely disposed cam surfaces 102 in the front face thereof which lie adjacent the back face of the side portions of the member 22. Such cam surfaces are in the form of surface recesses of predetermined slope, sloping from one radial end flush with the face portion of the cam 90 and to relative deepness at the other radial end of the recesses.

Apertures 104 are provided through the supporting member 22 at predetermined radial positions within the confines of the cam plate 90 and slidably receive therein the stems 106 of throw-out plungers. Such plungers have enlarged heads 108 integral with the stems 106 which bear against the front face of the member 22. The back ends of stems 106 are rounded and are adapted to bear against the cam surfaces 102 of the cam plate 90. The heads 108 are of such a size that when they are moved toward the floating bar 48 they will abut against the rear edge of the legs of the jaws 62 in whatever position the jaws 62 are along the length of the bar. In the embodiment illustrated there is only one plunger shown for each of the bars. Instead of using a single plunger for each bar, a plurality of such plungers could be readily disposed on each side of the center so that plungers of a smaller head size could be used with the assurance that the jaws 62 would be engaged in any one of its positions along the length of the floating bar.

Figure 4:
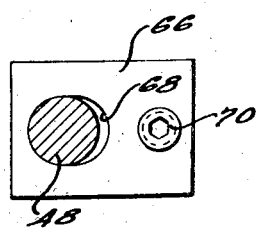
Fig. 4 is a cross-sectional view taken substantially along the line 4—4 of Fig. 3.
Figure 5:
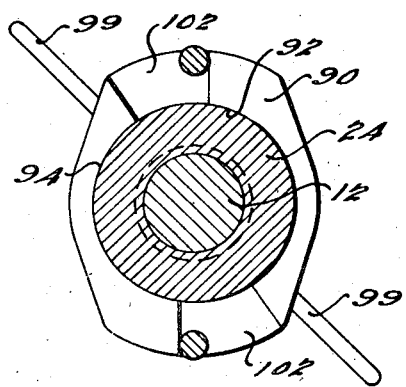
Fig. 5 is a cross-sectional view, on a reduced scale, taken substantially along the line 5—5 of Fig. 3.
Figure 6:
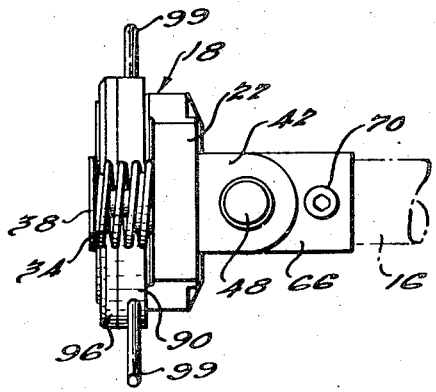
Fig. 6 is a top plan view of the structure illustrated in Fig. 2.
Figure 9:
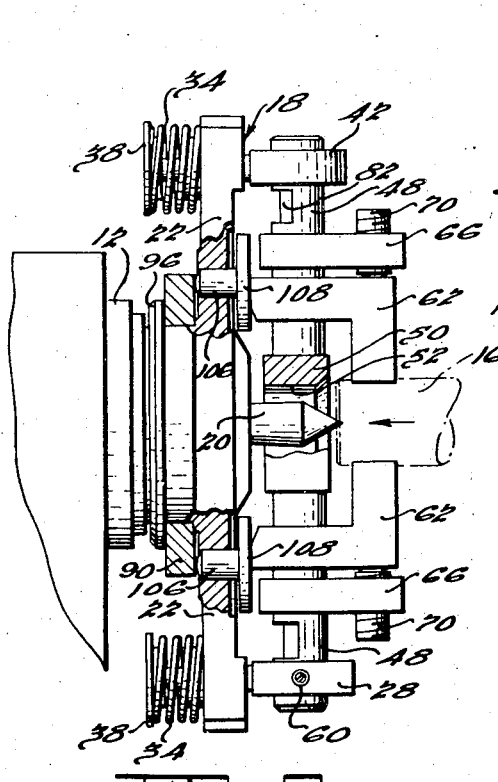
Fig. 9 is a view generally similar to Fig. 3, with certain of the parts in elevation, illustrating the parts in a different position from that shown in Fig. 3.
Figure 7:
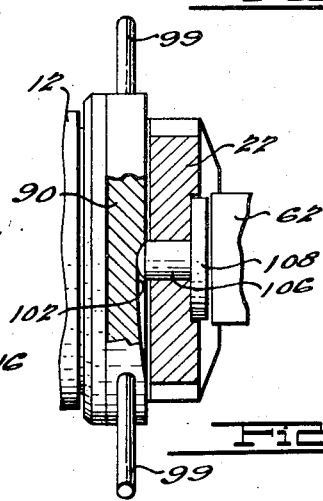
Fig. 7 is a cross-sectional view taken substantially along the line 7—7 of Fig. 3.

Viewing Figs. 3 and 4, Fig. 3 illustrates the normal position of the plungers when the jaws 62 are in clamping engagement with the workpiece. When the workpiece is supported in a steady rest, as mentioned above, the prior type bridle or strap may be eliminated by the following use or operation of the device of the present invention. The cam plate 90 is normally positioned so that the stems 106 project into the deepest portion of the cam grooves 102. The heads 108 are then not in engagement with the legs of the jaws 62. By then turning the cam plate in the direction indicated by the arrow in Fig. 5, the plungers are thrown outwardly so that the heads 108 bear against the rear edges of the jaws 62 and force such jaws together with the floating bar 48 away from the supporting member 22 against the resistance of springs 34. Such jaws are held in this position until they are clamped to the workpiece in the manner described above. That end of the workpiece engaging the center point 20 has previously been centered and the jaws are clamped thereto in the same way as that mentioned above so that the workpiece is clamped by the jaws for turning the workpiece during those machining operations which are to be performed.

After the jaws have been clamped to the workpiece, the cam plate is then turned back to its normal position, thus relieving the pressure of the plungers against the jaws. The springs 34 will then act to pull the floating bar 48 back toward the plate member 22. Since the plate member is axially fixed with respect to the center point 20, it will be appreciated that the workpiece is then pulled against the center point through the action of springs 34 and will be held thereagainst during the machining operation.

Formal changes may be made in the specific embodiments of the invention described without departing from the spirit and substance of the invention, the scope of which is commensurate with the appended claims.

What I claim as new and desire to secure by Letters Patent is:

1. A dog device adapted for attachment to the live spindle of a lathe having a center point element in which said device clamps a piece of work which has been properly positioned on said center point element comprising a supporting member adapted for driving attachment to said spindle, a bar member, means mounting said bar member on said supporting member transversely thereof so that said bar member is fixed for rotative movement with said supporting member but is at the same time slidable transversely of said supporting member, clamping members adapted to clamp said piece of work and mounted on said bar member, and means adjustably fixing said clamping members with respect to each other on said bar member in clamping relationship with said piece of work.

2. A dog device adapted for attachment to the live spindle of a lathe having a center point element in which said device clamps a piece of work which has been properly positioned on said center point element, comprising a supporting member adapted for driving attachment to said spindle, a bar member, means mounting said bar member on said supporting member transversely thereof so that said bar member is fixed for rotative movement with said supporting member but is at the same time slidable transversely of said supporting member, clamping members adapted to engage said piece of work, means mounting said clamping members on said bar member, and means for moving said clamping members toward and from each other, the construction and arrangement of such mounting means and said last named means being such that upon movement of one of said clamping members toward said piece of work, said other clamping member is equally moved toward said piece of work, whereby said clamping members exert equal clamping pressures on said piece of work.

3. A dog device adapted for attachment to the live spindle of a lathe having a center point element in which said device clamps a piece of work which has been properly positioned on said center point element, comprising a supporting member adapted for driving attachment to said spindle, a bar member extending transversely of said supporting member, means fixing the ends of said bar member on said supporting member against rotative movement with respect thereto but permitting transverse movement with respect thereto, clamping members, means mounting said clamping members on said bar member, and means for moving said clamping members toward and from each other, said last two named means being so constructed and arranged that when one of said clamping members is moved toward said piece of work the other clamping member is also equally moved toward said piece of work, so that said clamping members engage said piece of work with equal pressures.

4. A dog device adapted for attachment to the live spindle of a lathe having a center point element in which said device clamps a piece of work which has been properly positioned on said center point element, comprising a supporting member adapted for driving attachment to said spindle, a bar member, means resiliently urging said bar member toward said supporting member, clamping members slidably mounted on said bar member, and means mounted on said bar member and engaging said clamping members for adjustably fixing said clamping members with respect to each other on said bar member.

5. A dog device adapted for attachment to the live spindle of a lathe having a center point element in which said device clamps a piece of work which has been properly positioned on said center point element, comprising a supporting member adapted for driving attachment to said spindle, a bar member, means resiliently urging said bar member toward said supporting member, clamping members slidably mounted on said bar member, means mounted on said bar member and engaging said clamping members for adjustably fixing said clamping members with respect to each other on said bar member, and releasable means for urging said bar member away from said supporting member against the action of said resilient means.

6. A dog device adapted for attachment to the live spindle of a lathe having a center point element in which said device clamps a piece of work which has been properly positioned on said center point element, comprising a supporting member adapted for driving attachment to said spindle, a bar member, means resiliently mounting said bar member with respect to said supporting member, clamping members slidably mounted on said bar member, means mounted on said bar member and engaging said clamping members for adjustably fixing said clamping members with respect to each other on said bar member, and cam means for urging said bar member away from said supporting member.

7. A dog device adapted for attachment to the live spindle of a lathe having a center point element in which said device clamps a piece of work which has been properly positioned on said center point element, comprising a supporting member adapted for driving attachment to said spindle, a bar member, means resiliently mounting said bar member with respect to said supporting member, clamping members slidably mounted on said bar member, means mounted on said bar member and engaging said clamping members for adjustably fixing said clamping members with respect to each other on said bar member, and releasable means for urging said bar member together with said clamping members away from said supporting member, whereby upon release of said releasable means after said piece of work has been clamped, said piece of work is pulled against said center point element.

8. A dog device adapted for attachment to the live spindle of a lathe having a center point element in which said device clamps a piece of work which has been properly positioned on said center point element, comprising a supporting member adapted for driving attachment to said spindle, a bar member, means resiliently mounting said bar member with respect to said supporting member, clamping members slidably mounted on said bar member, and releasable cam means for urging said bar member together with said clamping members away from said supporting member, whereby upon release of said releasable cam means after said piece of work has been clamped, said piece of work is pulled against said center point element.

9. A dog device adapted for attachment to the live spindle of a lathe having a center point element in which said device clamps a piece of work which has been properly positioned on said center point element, comprising a supporting member adapted for driving attachment to said spindle, a bar member, mounting members disposed adjacent the ends of said bar member, said bar member being mounted to said mounting members and said mounting members being pivotally connected to said supporting member for pivoting about an axis parallel to that of said spindle, clamping members, means mounting said clamping members on said bar member, and means for moving said clamping members toward and from each other.

10. A dog device adapted for attachment to the live spindle of a lathe having a center point element in which said device clamps a piece of work which has been properly positioned on said center point element, comprising a supporting member adapted for driving attachment to said spindle, a bar member, mounting members disposed adjacent the ends of said bar member, said bar member being connected to said mounting members, means pivotally and resiliently mounting said mounting members on said supporting member such that resilient movement is permitted only in a direction parallel to the axis of rotation of the spindle, clamping members, means mounting said clamping members on said bar member, and means for moving said clamping members toward and from each other.

11. A dog device adapted for attachment to the live spindle of a lathe having a center point element in which said device clamps a piece of work which has been properly positioned on said center point element, comprising a supporting member adapted for driving attachment to said spindle, a bar member, mounting members disposed adjacent the ends of said bar member, said bar member being connected to said mounting members, means pivotally and resiliently mounting said mounting members on said supporting member, clamping members, means mounting said clamping members on said bar member, means for moving said clamping members toward and from each other, and releasable means operatively associated with said bar member for urging said bar member together with said clamping members away from said supporting member.

12. A dog device adapted for attachment to the live spindle of a lathe having a center point element in which said device clamps a piece of work which has been properly positioned on said center point element, comprising a supporting member adapted for driving attachment to said spindle, a bar member, mounting members disposed adjacent the ends of said bar member, means slidably connecting said bar member to said mounting members, means resiliently and pivotally connecting said mounting members to said supporting member, clamping members slidably mounted on said bar member, means mounted on said bar member and engaging said clamping members for adjustably fixing said clamping members with respect to each other on said bar member, and releasable cam means for urging said bar member together with said clamping members away from said supporting member against the action of the means which resiliently mount the mounting member with respect to the supporting member, whereby upon release of said releasable means after said piece of work has been clamped, said piece of work is pulled against said center point element, 13. A dog device adapted for attachment to the live spindle of a lathe having a center point element in which said device clamps a piece of work which has been properly positioned on said center point element, comprising a supporting member adapted for driving attachment to said spindle, a bar member, mounting members disposed adjacent the ends of said bar member, means slidably mounting one end of said bar member to its adjacent mounting member, means slidable with respect to the other of said mounting members and slidably mounting the other end of said bar member, means pivotally mounting said mounting members with respect to said supporting member, clamping members mounted on said bar member and means for moving said clamping members toward and from each other to clamp and release said piece of work.

14. A dog device adapted for attachment to the live spindle of a lathe having a center point element in which said device clamps a piece of work which has been properly positioned on said center point element, comprising a supporting member adapted for driving attachment to said spindle, a transverse member mounted on said supporting member in such manner that at least one end is fixed against circumferential movement with respect to the supporting member, clamping members mounted on said transverse member on opposite sides of said spindle, and means for moving said clamping members toward each other, the construction and arrangement being such that the clamping members are free to move into alignment with said spindle.

WILLIAM J. NIGHTINGALE.